Jan. 2, 1934.  F. W. SPERR, JR  1,942,072
GAS PURIFICATION
Filed Sept. 3, 1928  2 Sheets-Sheet 1

INVENTOR.
Frederick W. Sperr Jr.
BY Jesse R. Langley
ATTORNEY.

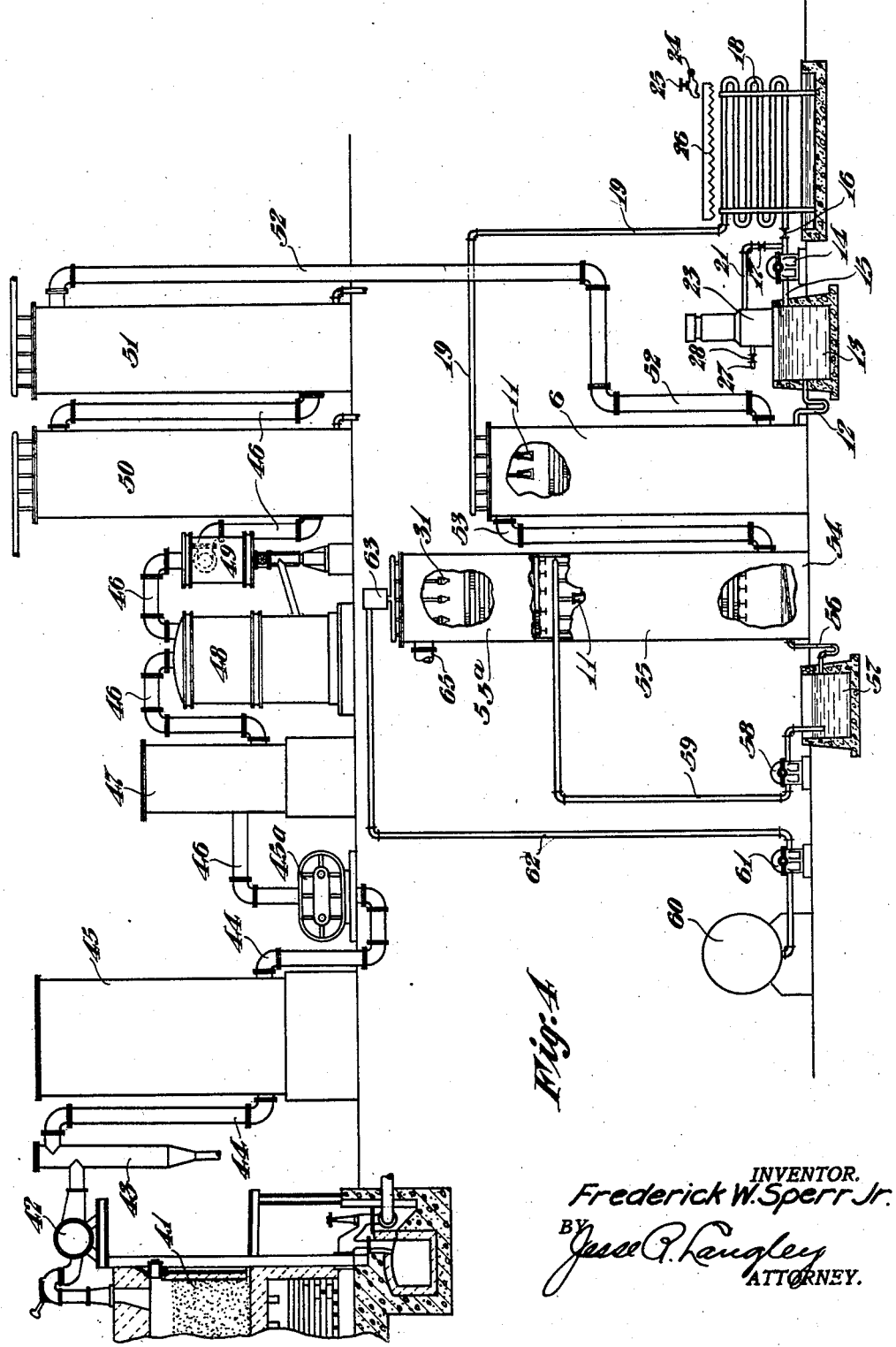

Patented Jan. 2, 1934

1,942,072

UNITED STATES PATENT OFFICE 1,942,072

GAS PURIFICATION

Frederick W. Sperr, Jr., Pittsburgh, Pa., assignor to The Koppers Company of Delaware, a corporation of Delaware Application September 3, 1928. Serial No. 303,620

1 Claim. (Cl. 48—197)

This invention relates to the manufacture of fuel gas such as coal gas, water gas and the like, and more particularly to the preparation of the gas for consumption rather than to the generation of the original and more or less crude gas.

An object of my invention is to provide a process for treating fuel gas after its generation that shall be effective to reduce corrosion and stoppage difficulties in the gas distribution system to a point heretofore never attained.

A further object of my invention is to provide a novel and useful combination both with respect to process for dehydrating fuel gas and for conditioning the dry gas against certain difficulties in distribution thereof which may otherwise be encountered.

A still further object of my invention is to provide a process whereby dehydration of fuel gas and the removal of naphthalene and analogous hydrocarbons therefrom may be practiced with mutual advantages.

My invention has for its further objects such other operative advantages and results as may hereinafter be found to obtain.

In order to prevent difficulties in distributing fuel gas which arise from stoppages of the mains, services, and appliances, fuel gas is often treated for the removal of naphthalene.

Complete freedom from stoppage and also freedom from corrosion trouble in the distribution system can, however, only be attained when the fuel gas is dehydrated, at least to a dew point below any temperature likely to obtain in the distribution system, and is also treated for the substantially complete removal of naphthalene. In addition to dehydration and naphthalene removal, the dry gas leaving the dehydrating equipment should be treated with oil, preferably in the form of a fog, for a number of important reasons which will be recited hereinbelow.

In accordance with my invention, I treat fuel gas with a dehydrating agent, preferably in liquid form, and immediately thereafter scrub the gas with oil. This oil may also be employed where desired to effect a more or less complete removal of naphthalene from the gas and is preferably employed in such manner as to leave an appreciable amount of oil in the gas in the form of a fog or vapor for the purpose of "lubricating" the gas. This dehydration and oil treatment is preferably applied to the gas after it has passed through the usual "purifying" system for the removal of hydrogen sulphide and other acidic impurities.

In order that my invention may be fully set forth and understood, I now describe with reference to the accompanying drawings the preferred manner in which it is carried out and embodied but without limiting myself to such illustrative examples.

In these drawings,

Fig. 4 is an elevational and more or less diagrammatic view of a plant for the manufacture of fuel gas including apparatus for dehydrating the gas and for removing naphthalene therefrom.

Similar numerals designate similar parts in each of the views of the drawings.

Figures 1, 2, 3:
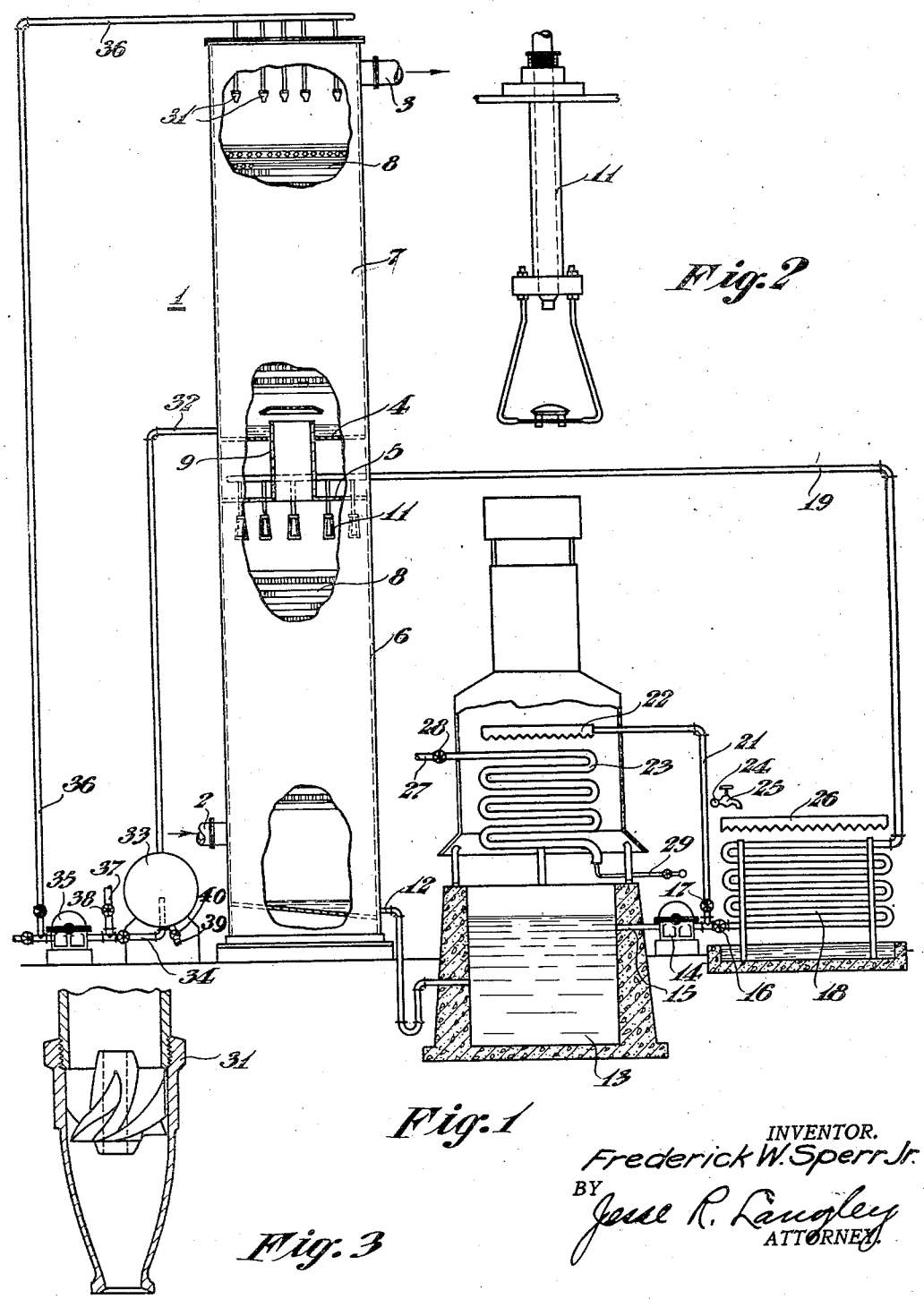
Figure 1 is an elevational view, parts being shown in vertical section, of apparatus for dehydrating fuel gas and for subsequently treating the gas with oil.
Fig. 2 is an elevational view of a form of spray used in a portion of the apparatus shown in Fig. 1.
Fig. 3 is a vertical sectional view of a form of spray used in another part of the apparatus shown in Fig. 1.

Referring to Fig. 1, a tower 1 of cylindrical configuration is provided with an inlet 2 for the coke-oven gas, carburetted water gas and other fuel gas to be treated at the bottom of the tower 1 and an outlet 3 for the gas at the top of the tower 1. The tower 1 is divided by means of partitions 4 and 5 into a lower or dehydrating section 6 and an upper or oil-scrubbing section 7, each of which is provided with suitable gas and liquid contact devices 8. Passage for the gas from the dehydrating section 6 to the oil scrubbing section 7 is provided through a vertical conduit 9 extending through the partitions 4 and 5.

The dehydrating section 6 is provided with a plurality of sprays 11 in the top thereof through which there is introduced a preferably continuous stream of liquid hygroscopic material, such, for example, as a solution of calcium chloride. This solution passes downwardly over the contact material 8 within the dehydrating section 6 in counter-current with the rising fuel gas and removes the greater part of the moisture from the gas.

During its passage through the dehydrating section 6, the hygroscopic liquid becomes somewhat diluted by moisture removed from the gas and also absorbs a certain amount of heat. In order that this solution may be used for further treatment of the gas, it must be restored to its original concentration and temperature. This is accomplished in the following manner:

The partially spent solution passes out of the bottom of the dehydration section 6 through a sealed overflow pipe 12 into a sump 13. A pump 14 is provided for the purpose of recirculating the hygroscopic liquid. The pump 14 draws the liquid from the sump 13 through a pipe 15. By manipulation of valves 16 and 17, a portion of the liquid thus withdrawn from the sump 13 is forced through cooling coils 18 and returns to the dehydrating section 6 through a pipe 19 and the sprays 11, and a further and preferably smaller portion is withdrawn through a pipe 21, is distributed from a trough 22 over heating coils 23, and returns to the sump 13.

The cooling coils 18 are of a well-known type, being supplied with cooling water from a pipe 24, having a valve 25 and a distributing trough 26. Water for cooling the hygroscopic liquid in the cooling coils 18 is supplied from whatever source of cool or cold water is convenient to the gas plant.

The heating coils 23 are supplied with steam or other heating fluid through a pipe 27 and a valve 28 and condensate is removed through a suitable device 29.

In passing through the cooling coils 18, the hygroscopic liquid is reduced to a temperature approximately equal to the mean atmospheric temperature and the heat absorbed in the dehydrating operation is thus dissipated.

Sufficient steam is supplied to the heating coils 23 to effect an evaporation of that portion of the hygroscopic liquid in contact therewith sufficient to compensate for the moisture removed from the gas being treated.

This by-pass method of reconcentration is advantageous in that it avoids the necessity of heating and then cooling all of the recirculating liquid and provides for a high efficiency in the concentration stage, but such method is a well-known expedient, being shown in the U. S. Patent No. 910,525 to Gardner, dated January 26, 1909, and elsewhere.

The liquid used in the dehydrating section 6 may be any suitable hygroscopic liquid, that is, any liquid having a vapor pressure at approximately atmospheric temperature that is low enough to reduce the dew-point of the gas to a point materially below such temperature, for example, to a point below any temperature likely to obtain in the distribution system subsequently traversed by the gas. Calcium chloride and other well-known hygroscopic brines often used for dehydrating purposes may be employed here but other liquids having the above property may also be employed. A material which has been employed successfully comprises a solution of sodium thiocyanate, obtained from gas purification mother liquor. This use of this material is the invention of another. It has been found that by effecting a dehydration of the fuel gas to the extent described, practically all the advantages of a dry gas with respect to the distribution system are attained by reason of the fact that no condensation will occur in said distribution system under such conditions.

By way of specific example of the procedure indicated hereinabove, the gas is dehydrated to a dew point approximately 5° below the temperature of the mains. For example, to a dew point of 40° F. where the temperature in the mains is 45° F. Not only is dehydration merely to this extent sufficient to prevent deposition of water, but it is also highly desirable, especially where the mains have previously been used for the transmission of moist gas, in that a too rapid drying-out action is prevented and the effects of the relatively slow drying-out which does take place can readily be controlled by subsequent "lubrication" of the gas with oil in the manner herein described.

The sprays 11, which are employed in the dehydrating section 6, are preferably of such type as to prevent unnecessary comminution of the liquid. A form of spray which has been found very suitable for this purpose is shown in Fig. 2 and is further described and claimed in the U. S. Patent No. 1,597,715, granted August 31, 1926 to Carroll D. Blackburn for Liquid distributing apparatus.

While this type of spray is very effective to reduce entrainment of the hygroscopic liquid to a minimum, nevertheless some of the liquid is inevitably entrained and it is very desirable to remove any such entrained liquids.

For this purpose, the gas is passed through an oil-scrubbing section 7 and traverses the gas and liquid contact apparatus 8 situated therein. In passing through said contact devices 8, the gas is substantially entirely deprived of any hygroscopic liquid entrained therein.

To assist in the removal of entrained hygroscopic liquid and to introduce a limited amount of oil into the dehydrated gas, oil is supplied, preferably continuously, to the gas and liquid contact devices 8 of the oil scrubbing section 7 through a plurality of sprays 31. This oil passes downwardly through the contact devices 8 in counter-current to the rising gas, is then removed from the bottom of the oil-scrubbing section 7 through a pipe 32 and returns to an oil storage tank 33, from which it may be recirculated through a pipe 34, a pump 35, a pipe 36 and the sprays 31.

The sprays 31 are preferably of a type effective to reduce an appreciable portion of the oil into the form of a fog, in which state it will be entrained by the fuel gas leaving the tower 1. A well-known form of spray which has been found suitable for this purpose is illustrated in Fig. 3 and need not be described in detail.

The bulk of the oil, as hereinabove described, passes through the oil-scrubbing section 7 in counter-current with the gas.

Fresh oil is drawn into the oil recirculation system as required through the pipe 37 having a valve 38.

The oil leaving the scrubbing section 7 carries with it any hygroscopic liquid removed from the gas. This liquid collects in the bottom of the tank 33, and may be removed therefrom as desired through a drain 39 having a valve 40.

The oil used in the oil recirculating system should preferably range in volatility between kerosene and gas oil. The so-called "mineral seal" oil is very satisfactory. An oil of this type has an appreciable vapor tension so that the gas in contact with it becomes saturated with such vapor and deposits a little of the oil when it is later cooled in the distributing system, so that the lubrication obtained from the entrained oil is augmented by that from the condensed oil vapor. Furthermore, the volatility of such oil is so small that the cost of the portion vaporized is insignificant.

While naphthalene removal is not the purpose of the system shown in Fig. 1, it is obvious that unless naphthalene has previously been removed from fuel gas, the recirculated oil will, upon first coming in contact with the gas, remove naphthalene therefrom and such naphthalene removal will continue until the oil absorbs enough naphthalene to bring it into equilibrium with the gas. Thereafter, naphthalene will only be removed from the gas in proportion to the amount of fresh oil required to replenish the recirculating system.

The amount of oil which it is necessary to supply for this purpose is, of course, equal to the amount of oil carried out of the oil-scrubbing section 7 in the form of a fog, and it is governed by the type of spray used and the rate of recirculation and can be adjusted to any desired figure by the operator.

In many cases where naphthalene removal is not practiced prior to dehydration of the gas, the oil-scrubbing section 7 may be employed for this purpose by maintaining the oil out of equilibrium with the gas, for example, by distillation or other treatment to remove naphthalene from the recirculated oil.

However, when it is desired to remove naphthalene immediately after dehydration of the gas, in which case the naphthalene removal system will accomplish the other functions of the oil-scrubbing section in this position, I prefer to employ the process described and claimed in U. S. Patent No. 1,578,687, granted to me on March 30, 1926, for a Process for the removal of naphthalene and analogous hydrocarbons from fuel gas. Such an arrangement is shown in Fig. 2 of the drawings, comprising the entire manufacturing process, with particular reference to coke-oven gas.

The coke-oven gas produced in a battery of coke ovens 41 passes through the usual collecting main 42, pitch trap 43 and suction main 44 into the primary cooler 45, where it is partially cooled to permit the removal of tar. The gas then passes through a further portion of the suction main 44 into the exhauster 45a, from which it is passed under substantially the pressure at which it is to be distributed through a pressure main 46, a tar extractor and reheater 47, an ammonia saturator 48, an acid separator 49, purification apparatus 50 and a final cooler 51.

All of the above apparatus is of a well-known type, adapted to perform the functions of removing tar, ammonia and acidic impurities, respectively, from the fuel gas.

The final cooler 51 is of well-known type, being supplied with water at substantially atmospheric temperature in a well-known manner, and effects a cooling of the gas to a temperature approximately equal to the mean atmospheric temperature, incidentally effecting a partial dehydration of the gas and reducing its dew point to a point approximately equal to the mean atmospheric temperature. However, such partial dehydration alone is not sufficient to prevent subsequent deposition of moisture.

The gas then passes through a main 52 into the dehydrating apparatus 6, which, in this instance, is in the form of a separate tower being supplied with recirculated hygroscopic liquid in the manner of Fig. 1. The gas, after dehydration, passes through a conduit 53 to naphthalene removal apparatus 54.

The naphthalene removal apparatus 54 consists primarily of a lower or recirculating section 55 and an upper or final section 56. The gas is treated in the recirculating section 55 for the removal of the greater part of its naphthalene content, as well as any hygroscopic liquid entrained from the dehydrating apparatus 6 by means of a relatively large volume of oil recirculated at a high rate through a system comprising a section 55, a seal pipe 56, a sump 57, a pump 58, a return line 59 and sprays 11.

The gas then passes into the final section 55a, where it is treated with a relatively small amount of fresh oil, preferably introduced intermittently and at a high rate in order to insure good distribution.

For this purpose, fresh oil is drawn from a storage tank 60 by a pump 61 and passes through a line 62 and an intermittent supply device 63 of suitable type to a plurality of sprays 31.

The oil in the recirculating section 55, while nearly saturated with naphthalene with respect to the gas, is effective to remove a considerable portion of the naphthalene contained by the gas by reason of its large volume and high rate of recirculation, whereas the fresh oil in the final section 55a is effective to substantially completely remove the remaining naphthalene from the gas.

The partially spent oil from the final section 55a passes downward through the tower 54 and enters the recirculating section 55, where it refreshes the recirculating oil used in the latter section. Excess oil and entrained hygroscopic liquid are removed from the sump 57 as necessary.

Sprays of the type shown in Fig. 3 are employed in the final section 56 in order to insure that the gas leaving the tower 55a contains a small amount of oil in the form of a fog.

The gas, free of naphthalene, with a dew point below any temperature likely to obtain in the distribution mains, and containing a small amount of oil in the form of a fog, then passes through a pipe 65 into the distributing system.

While the system of naphthalene removal described above and further described in my Patent No. 1,578,687, has been found to be particularly advantageous for the removal of naphthalene from fuel gas, my invention is not limited to the use of this process and any other naphthalene removal process may be employed in this case.

Moreover, the oil scrubber may be employed to remove other substances from the gas, such, for example, as light oils, or even carbon bisulphide.

With respect to the dehydration of the gas, this part of my process may be accomplished when desired in other ways, as, for example, with solid or semi-liquid hygroscopic materials, or with a refrigerated liquid.

I have shown that the combination of dehydration and naphthalene removal is necessary in order to insure complete freedom from stoppages, from corrosion and from many other difficulties in the gas distribution system. Aside from the removal of naphthalene, the treatment of the gas with oil in a manner effective to maintain a small amount of oil in the gas in the form of a fog is particularly advantageous with respect to dehydration in that it "lubricates" the gas and prevents a dusty condition in the mains.

Moreover, such lubrication of the gas is effective to reduce the danger of corrosion and deposits of solid material in the meters, governors, pilot lights and the like encountered in the distribution of the gas. Furthermore, the presence of a small amount of oil fog in the gas is beneficial by reason of the fact that it serves to seal small leaks in the mains and service appliances and thus to prevent loss of gas.

Aside from the advantages inherent in the dehydration of fuel gas itself, such dehydration is advantageous with respect to the removal of naphthalene in that it prevents the deposition of moisture from the gas in the oil-scrubbing system and the consequent formation of oil-water emulsions and thus renders the removal of naphthalene more facile and effective.

While it is often desirable to remove naphthalene prior to purification of the gas from acidic impurities, it is apparent that the removal of naphthalene immediately after dehydration of the gas has certain advantages as above recited and is effective to eliminate the necessity of a separate oil-scrubbing section following the dehydration apparatus which is necessary when the removal of naphthalene is not desired, or is practiced prior to dehydration.

My invention is not limited to the specific examples given hereinabove by way of illustration but it may be variously employed within the scope of the claims hereinafter made.

I claim as my invention:

In the process of manufacturing coal gas comprising preliminarily cooling the gas as it issues from retorts therefor, purifying the gas, finally cooling the gas and thereafter scrubbing the finally cooled gas with oil to remove naphthalene, the improvement comprising treating the gas after the final cooling step but before the naphthalene removal step with a hygroscopic liquid comprising one of the group consisting of hygroscopic brines and sodium thiocyanate, to dehydrate the gas while at its final distribution temperature and so that any entrained salt solution therefrom carried along by the gas will be removed from the gas as an incident of the naphthalene scrubbing step.

FREDERICK W. SPERR, JR.